Patented May 15, 1928.

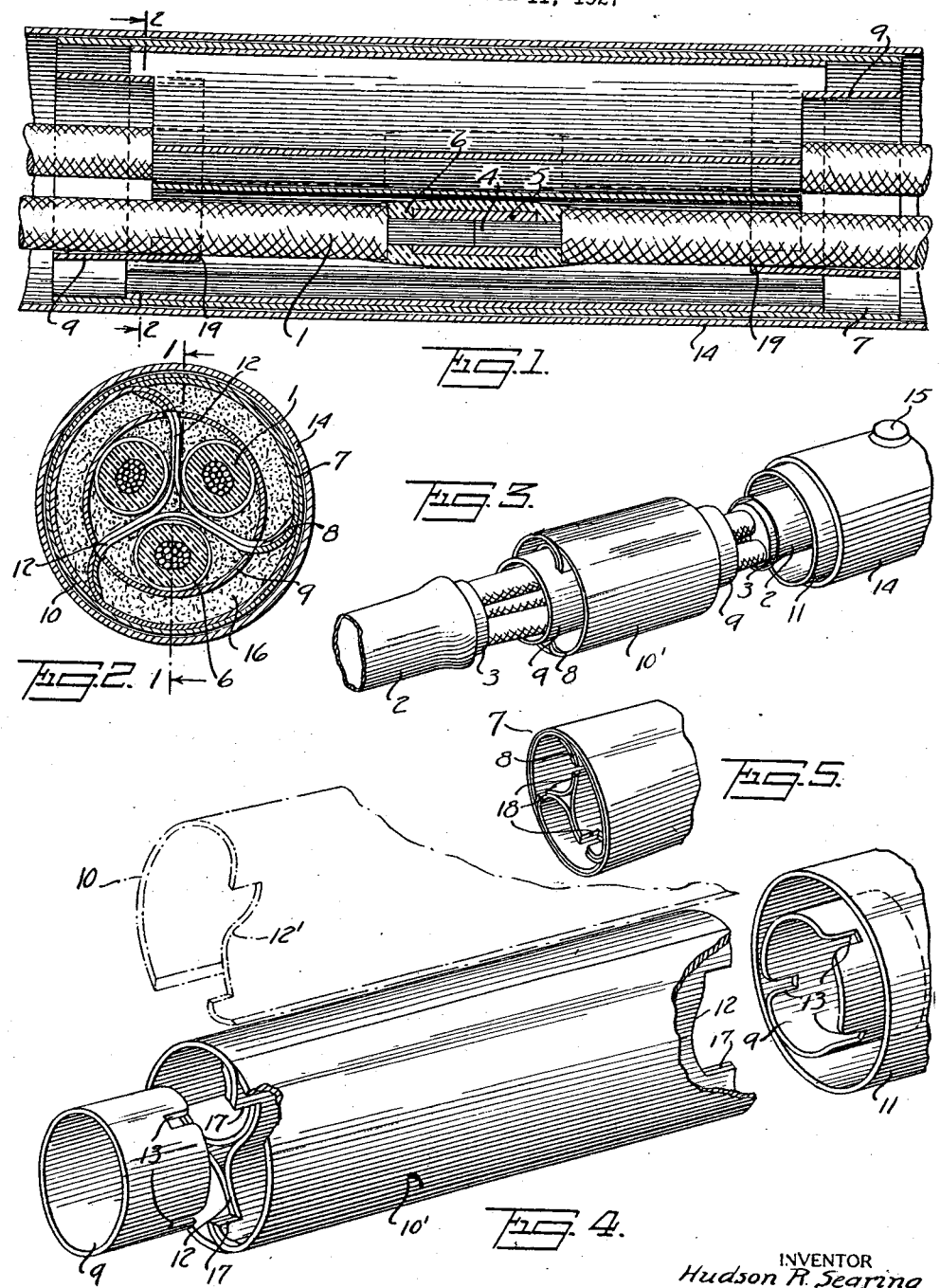

1,670,218

UNITED STATES PATENT OFFICE.

HUDSON R. SEARING, OF NEW YORK, AND ERNEST WILLIAMS, OF JACKSON HEIGHTS, NEW YORK, ASSIGNORS TO ENGINEERING PRODUCTS CORPORATION, OF NEW YORK, N. Y., A CORPORATION OF NEW YORK.

MEANS FOR PREVENTING CURRENT LEAKAGE IN ELECTRIC CABLES.

Application filed March 11, 1927. Serial No. 174,465.

This invention relates to the insulation of high tension cables and high tension cable joints, and particularly to the general type of insulation disclosed in U. S. Letters Patents Nos. 1,165,141 and 1,237,401 to S. D. Sprong and W. E. McCoy. This type of insulation includes generally an insulating tube of high dielectric strength with insulating partitions of similarly high dielectric strength dividing the tube into longitudinal compartments for accommodating the cable conductors and an insulating filler or mass in each compartment in which the conductors are embedded, the tube and the partitions forming barriers to the passage of leakage current. In the installation of insulation of this type it has been the practice to employ special spreading and spacing insulating blocks at the ends of the insulating tube and between the cable conductors to maintain a larger space clearance through the joint and to center the insulating tube with reference to the cable. These spreader blocks ordinarily have a different and usually higher dielectric constant or S. I. C. than the cable insulation and cause a serious unbalance in the potential or dielectric stress at the points where they are located with a concentration of excess stress in certain areas and consequent increased liability to breakdown, and this liability to breakdown is the more pronounced the higher the voltage because of the nice balance that must be employed in the symmetrical arrangement of the conductors, the amount of insulation upon each and the lesser safety margin of excess insulation that is permissible on high voltage cables. Moreover, the higher the voltage, the cable conductors must have correspondingly greater depths of insulation around them and are therefore more rigid mechanically and permit very little spreading without causing serious strain or injury to the insulation. The present invention resides in a high tension cable insulation of the above generally indicated character in which the insertion of sperading blocks between the conductors at the points where they enter the tube is avoided and in which, on the contrary, the cable conductors are positively restricted in spread by special insulating holding means closely surrounding them adjacent the ends of the tube and supporting the latter concentrically with reference to the cable. In the particular embodiment herein exhibited this special holding or centering and spread resisting means includes locking rings of the same insulating material as the tube but of smaller diameter and mounted in the ends thereof, which rings closely surround the cable conductors and firmly anchor and center the unit thereabout, and prevent relative movement between the tube and the conductors. When the new insulating unit is employed for cable joints it is only necessary to spread the conductors a sufficient amount to effect the mechanical coupling and the taping of the latter, and there is no extraneous material between or in the crotch of a multi-conductor cable to cause an unbalancing of the potential stress.

For a better understanding of the invention, reference may be had to the accompanying drawings exhibiting one embodiment thereof, wherein:

Fig. 1 is a longitudinal cross section of a cable joint with the invention applied thereto, Fig. 2 is a transverse cross section of the cable joint on the line 2—2 of Fig. 1, Fig. 3 is a perspective view of a part of the assembled insulating means.

Fig. 4 is a partly exploded view of the insulating unit, and

Fig. 5 shows a slightly modified construction.

Referring to the drawings, we have illustrated the invention as applied to a multiphase high tension cable of the three-phase type, including the three insulated conductors 1 provided with a lead sheath 2 and a layer of insulation 3 between the lead sheath 2 and the three insulated conductors 1. The conductors 1 are indicated as joined or coupled together at 4 in the usual manner, as for example by means of metallic sleeves 5, and tape insulation 6 is wound thereabout up to a level with or slightly beyond the mil insulation of the cable conductor. The embodiment of our invention shown includes an elongated tubular insulating member 7 (Fig. 2) provided with longitudinally extending partitions or barriers 8 therein which divide the tube into three separate and insulated compartments for the accommodation of the insulated conductors 1, one for each conductor, and the tube 7 being of comparatively large diameter. At the points where the conductors 1 enter the tube 7 there are provided special anchoring and centering rings 9 which are of smaller diameter than the tube 7 and closely surround the cable conductors 1 and are fixed within the adjacent ends of the tubular member 7 to hold and prevent the conductors 1 from spreading and to maintain the conductors 1 and the surrounding tube 7 (and partitions 8) centrally and symmetrically arranged with reference to each other. The insulating rings 9 are observed to engage the conductors 1 at the inner ends of the former, as indicated at 19. In the particular embodiment shown the elongated insulated tube 7 and the partitions 8 are illustrated as generally of the construction set forth in the Letters Patent No. 1,165,141, patented December 21, 1915, including the specially and symmetrically formed members 10 (Fig. 4) which mutually interlock with each other to form the double wall partitions or barriers 8 and a cylindrical outer surface 10', together with the integrally formed insulating tube 11 which closely surrounds the interfitting parts 10 to form the double wall cylindrical surface 7 of Figs. 1 and 2. The locking and centering insulating rings 9 may be fixed relatively to the partitioned tubular structure 7 in any suitable manner, as for example by fitting into seats or recesses 12 formed in the ends of the partition walls 8, these seats 12 being formed by registering notches 12' formed in the ends of individual partition or barrier members 10. The notches 12' are so formed as to provide, when the parts 10 are matched together, the three shoulders 17 which are adapted to engage the exterior surfaces of the rings 9 when the latter are inserted in position. The rings 9 may be provided on their inner edges with longitudinal notches 13, one for each of the insulated partitions 8 and when the members 9 are inserted in their respective seats 12 formed in the ends of the partitions 8, the notches 13 register with and accommodate the partitions 8 and form a securing means preventing relative rotation of the members 9 and the insulating tube 7. In Figs. 1 and 2 the completed joint is indicated, the insulating tube 7, its partitions 8 and the locking rings 9 being assembled into operative position, the rings 9 preferably being of the same character of insulating material as the tube 7 and its partitions or barriers 8, namely of a high dielectric constant or S. I. C. The rings 9 closely surround the conductors 1 of the multi-conductor cable and permit only sufficient spreading or spacing of the conductors to pass on the opposite sides of partitions 8, and moreover not only prevent any pronounced spreading or spacing of the conductors 1, but positively hold and retain them within the prescribed area of the ring and also form a centering means for the insulating tube 7 and partition 8 unit so as to maintain an entirely symmetrical arrangement. At 14 we have indicated the usual casing, as for example of lead, surrounding the joint and forming a closed chamber thereabout with its ends sealed to the lead sheaths 2 of the cable. At 15 are indicated filling holes for introducing any suitable insulating compound, either in a liquid, semi-liquid or plastic state, this compound being indicated by the numeral 16 and being observed to fill all the compartments both inside and outside of the insulating tube 7, the conductors 1 being entirely embedded in this insulating filler.

The method of assembly is generally as follows: Before the conductors are mechanically coupled together, the solid insulating tube 11 and the insulating rings 9 are slipped over the conductors with the notches 13 of the rings 9 facing each other. Also, of course, the outer casing 14 is slipped over one end of the cable before the conductors are joined together. The conductors are then joined together and insulated by means of the tape 6, the conductors 1 being spaced or spread only sufficiently to effect the joining and taping. The specially formed partition or barrier parts 10 are then threaded one by one in between the conductors 1 and about the joints (4, 5, 6), as indicated in Fig. 3, whereupon the end rings 9 are inserted into their seats 12 formed in the ends of the members 10 and closely surrounding the cables 1 so as to accurately center the insulating members 10 and hold the conductors in a closely disposed position. The solid insulating tube 11 may be slipped over the interfitting partition members 10 either before, after or simultaneously with the positioning of the locking rings 9. With the insulating unit thus assembled round about the cable, the casing 14 is then moved longitudinally over the unit and over the exposed part of the cable conductors and the ends of the casing 14 are caused to form a wipe joint and water-tight seal with the lead cable sheaths 2. The filling compound 16 is then introduced through the openings 15. With the joint insulated in this manner, it is found that the cable is capable of withstanding the prevailing higher voltages, as for example 33,000 volts, indefinitely without breakdown, and moreover, by reason of the particular structure herein exhibited, the tendency for relative movement between the conductor splice and the insulating unit is eliminated or substantially reduced with the consequent avoidance of the formation of voids and such like within the filling material 16.

In Fig. 5 we have shown the ends of the partition walls 8 provided with narrow slots or notches 18 for the reception of the end rings 9, thereby avoiding the loss of insulating material where the central end part of the partition structure is removed as in the other figures. Also of course it is obvious that the notches 13 in the rings 9 may be omitted, and the latter merely inserted in the recesses 12 or in the slots or notches 18.

We claim:

1. A joint for a high tension electric multi-conductor cable including an enclosing insulating tube which is divided longitudinally into insulated compartments one for each line conductor and insulating rings anchored in fixed relation to the ends of the tube, said rings being of substantially smaller diameter than the tube and closely surrounding the conductors to restrict the spreading thereof and to support the insulating tube from the rings.

2. A joint for a high tension electric multi-conductor cable comprising an insulating tube of comparatively large diameter surrounding said conductors and having longitudinally insulated compartments therein, one for each conductor, insulating rings of substantially the same dielectric strength as the tube but of smaller diameter and adapted to closely surround the multi-conductors of the cable and means for anchoring said rings in the ends of said tube and concentrically with reference thereto.

3. A joint for a high tension electric cable including an insulating tube of comparatively large diameter enveloping and surrounding said cable, insulating rings of substantially the same dielectric strength as the tube but of smaller diameter and closely surrounding the cable, and means for anchoring said rings adjacent the ends of said tube and concentrically with reference thereto.

4. Insulating means for joints for high tension cables including an elongated tube of comparatively large diameter adapted to envelope and surround the cable and insulating rings of smaller diameter than said tube and adapted to closely surround the cable, said insulating rings and said tube being provided with means for anchoring the rings firmly and concentrically adjacent the ends of said insulating tube.

5. Insulating means for joints for high tension cables including an elongated insulating tube of comparatively large diameter and an insulating partition structure within said tube, said insulating partition structure having a recess or seat formed on either end thereof and insulating locking rings of smaller diameter than said main insulating ring and disposed in said recessed ends of the partition structure.

6. Insulating means for joints for high tension multi-conductor cables including an elongated insulating tube and an internal insulating partition structure of high dielectric strength, insulating rings also of a high dielectric strength but of smaller diameter than said tube and means for anchoring said rings in the ends of said tube so as to be concentric therewith.

7. Insulating means for joints for high tension multi-conductor cables including an elongated insulating tube of high dielectric strength and an internal insulating structure dividing the tube into longitudinal compartments, one for each conductor, said internal partition structure being recessed at either end to form a recess concentric with the tube and insulating rings of a substantially smaller diameter than said tube but fitting into said recesses so as to be held concentrically with said insulating tube.

8. Insulating means for joints for high tension multi-conductor cables including a plurality of elongated specially formed insulating barriers, said barriers being adapted to be threaded between the conductors of the cable to form barrier partitions therebetween and insulating rings adapted to be anchored in the ends of said barrier structure, said barrier structure and the rings being provided with means for carrying the one from the other.

9. Insulating means for joints for high tension multi-conductor cables including an insulating tube of high dielectric strength, a plurality of insulating barrier and partition members adapted to be threaded between the conductors and to be firmly anchored in position within said elongated tube, and insulating rings of substantially smaller diameter than the insulating tube together with means for anchoring said rings adjacent the ends of said insulating tube and in concentric relation therewith.

10. A high tension joint of the character set forth in claim 9 wherein the means for anchoring the rings adjacent the ends of said insulating tube and in concentric relation therewith consists of spaced notches formed in the ends of the rings for receiving the barrier and partition members.

11. Insulating means of the character set forth in claim 9 wherein the insulating rings are provided with notches registering with and adapted to accommodate the barrier and partition members for firmly anchoring the rings within the ends of the insulating tube.

12. Insulating means for joints for high tension multi-conductor cables including an insulating tube of high dielectric strength, a plurality of insulating barrier and partition members adapted to be threaded between the conductors and to be firmly anchored in position within said elongated tube and an insulating ring of substantially smaller diameter than the insulating tube together with means for anchoring said ring within one end of said insulating tube and in concentric relation therewith.

13. A joint for a high tension electric multi-conductor cable including an enclosing tube which is divided longitudinally into insulated compartments one for each line conductor and insulating means closely surrounding the cable conductors and anchored so as to bear a fixed relation to the ends of said tube, said insulating means being adapted to restrict the spreading of the conductors and to support the insulating tube therefrom.

14. A joint for a high tension cable of the character set forth in claim 13 wherein the insulating means closely surrounding the cable is supported by notches formed in the end of the tube partition structure.

15. An insulating means for joints for high tension multi-conductor cables including an insulating tube of high dielectric strength, a plurality of insulating barrier and partition members adapted to be threaded between the conductors and to be firmly anchored in position within the said tube, said members when assembled forming curved partitioned walls and an insulating ring of substantially smaller diameter than the insulating tube closely surrounding the conductors and anchored at one end of said insulating tube and in concentric relation therewith, said ring having spaced notches formed on one end thereof and being anchored in position by the curved ends of the partition walls entering into these notches.

In testimony whereof, we have signed our names to this specification.

HUDSON R. SEARING.
ERNEST WILLIAMS.